US012203416B2

(12) United States Patent
Couture (10) Patent No.: US 12,203,416 B2
(45) Date of Patent: Jan. 21, 2025

(54) TRANSDUCER ASSEMBLIES THAT SELECTIVELY MEASURE A FUEL PRESSURE WITHIN A FUEL SUPPLY SYSTEM OF AN AIRCRAFT, AIRCRAFT THAT INCLUDE THE TRANSDUCER ASSEMBLIES, AND METHODS OF UTILIZING A TRANSDUCER ASSEMBLY TO TEST PERFORMANCE OF A FUEL BOOST PUMP ASSEMBLY OF AN AIRCRAFT (71) Applicant: The Boeing Company, Chicago, IL (US)

(72) Inventor: Matthew A. Couture, Krum, TX (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/965,627

(22) Filed: Oct. 13, 2022

(65) Prior Publication Data
US 2024/0125273 A1 Apr. 18, 2024

(51) Int. Cl.
F02C 7/22 (2006.01)
G01L 19/00 (2006.01)
G01L 19/08 (2006.01)

(52) U.S. Cl.
CPC ............ F02C 7/22 (2013.01); G01L 19/0007 (2013.01); G01L 19/083 (2013.01)

(58) Field of Classification Search
CPC .... F02C 7/22; G01L 19/0007; G01L 19/0015; G01L 19/083
See application file for complete search history.

(56) References Cited

U.S. PATENT DOCUMENTS 3,981,199 A * 9/1976 Moore ................... G01L 19/14
73/431
4,107,697 A * 8/1978 McCracken .......... G01L 19/083
346/17
5,138,559 A 8/1992 Kuehl et al.
(Continued)

OTHER PUBLICATIONS

European Patent Office, Extended European Search Report in related application, No. EP23202613, Mar. 4, 2024.

Primary Examiner — Arun Goyal
(74) Attorney, Agent, or Firm — Kolitch Romano Dascenzo Gates LLC (57) ABSTRACT Transducer assemblies that selectively measure a fuel pressure within a fuel supply system of an aircraft, aircraft that include the transducer assemblies, and methods of utilizing a transducer assembly. The transducer assemblies include an electronic pressure transducer, which is configured to measure the fuel pressure and to generate a fuel pressure signal indicative of the fuel pressure, and an electronic pressure display, which is configured to receive the fuel pressure signal and to display the fuel pressure responsive to receipt of the fuel pressure signal. The transducer assemblies also include a power supply structure and an attachment structure, which is configured to operatively interconnect the electronic pressure transducer to the aircraft. The attachment structure includes a fitting, which is configured to interface with a pressure switch receptacle of the aircraft, and a valve actuation structure, which is configured to selectively actuate a receptacle valve of the pressure switch receptacle.

17 Claims, 4 Drawing Sheets (56) References Cited

U.S. PATENT DOCUMENTS

| | | | |
|---|---|---|---|
| 6,301,969 B1* | 10/2001 | Hess | G01F 1/38 |
| | | | 73/756 |
| 2001/0039964 A1* | 11/2001 | Gul | G01L 19/0015 |
| | | | 137/557 |
| 2014/0053645 A1 | 2/2014 | Ward et al. | |
| 2017/0321608 A1* | 11/2017 | Crowley | F02C 7/222 |

* cited by examiner

TRANSDUCER ASSEMBLIES THAT SELECTIVELY MEASURE A FUEL PRESSURE WITHIN A FUEL SUPPLY SYSTEM OF AN AIRCRAFT, AIRCRAFT THAT INCLUDE THE TRANSDUCER ASSEMBLIES, AND METHODS OF UTILIZING A TRANSDUCER ASSEMBLY TO TEST PERFORMANCE OF A FUEL BOOST PUMP ASSEMBLY OF AN AIRCRAFT

FIELD

The present disclosure relates generally to transducer assemblies that selectively measure a fuel pressure within a fuel supply system of an aircraft, to aircraft that include the transducer assemblies, and/or to methods of utilizing a transducer assembly to test performance of a fuel boost pump assembly of an aircraft.

BACKGROUND

Vehicles such as aircraft may include a fuel supply system, which may be configured to deliver fuel from one or more fuel tanks to one or more engines to sustain combustion during ground and flight operations. The fuel supply system may include the one or more fuel tanks, one or more fuel supply conduits, and one or more fuel boost pump assemblies and may be configured to deliver fuel from any fuel tank of the one or more fuel tanks to any engine of the one or more engines. Each fuel boost pump assembly may include one or more fuel pumps.

In general, a plurality of fuel pumps may be utilized to provide, to produce, and/or to generate positive pressure within various regions of the fuel supply system. This may permit and/or facilitate maintaining aircraft weight and balance during flight operations. In some examples, fuel pump output pressure of a given fuel pump purposefully may be higher when compared to the other fuel pumps, such as to induce an override condition. This may permit the fuel in a corresponding fuel tank to be supplied to the engine even though other fuel pumps are active in the other connected fuel tanks in the fuel supply system.

An aircraft fuel pump typically is an electrical motor attached to an impeller, supported by bearings, and enclosed in a housing. The fuel boost pump assembly is designed for a specific fuel supply system for a given aircraft. The fuel boost pump assembly commonly is inserted into a designated cavity that is part of a fuel tank, and it is common for a pressure switch to be mounted to, or proximate, the fuel boost pump assembly via a pressure switch receptacle. The pressure switch may be utilized to notify the flight crew that the fuel pump is producing a predetermined pressure. However, the pressure switch simply is an on/off switch and cannot be utilized to provide information regarding the performance of a given fuel pump and/or of the overall performance of the fuel supply system.

As a fuel pump wears, the pressure that it supplies generally will decrease. While the above-described pressure switch may be utilized to establish a threshold, or baseline, for minimum acceptable fuel pump performance, it cannot provide information regarding the level of wear within the fuel pump and/or changes in pressure output from the fuel pump as a function of time and/or wear. As such, it is common to proactively replace fuel pumps during aircraft maintenance and/or fuel supply system troubleshooting, often when there is no need to do so. This increases maintenance time and costs for the associated aircraft. Thus, there exists a need for improved transducer assemblies that selectively measure a fuel pressure within a fuel supply system of an aircraft, to aircraft that include the transducer assemblies, and/or to methods of utilizing a transducer assembly to test performance of a fuel boost pump assembly of an aircraft.

SUMMARY

Transducer assemblies that selectively measure a fuel pressure within a fuel supply system of an aircraft, aircraft that include the transducer assemblies, and methods of utilizing a transducer assembly to test performance of a fuel boost pump assembly of an aircraft are disclosed herein. The transducer assemblies include an electronic pressure transducer, which is configured to measure the fuel pressure and to generate a fuel pressure signal indicative of the fuel pressure, and an electronic pressure display, which is configured to receive the fuel pressure signal and to display the fuel pressure responsive to receipt of the fuel pressure signal. The transducer assemblies also include a power supply structure, which is configured to electrically power the electronic pressure transducer and the electronic pressure display, and an attachment structure, which operatively interconnects the electronic pressure transducer to the aircraft. The attachment structure includes a fitting, which is configured to interface with a pressure switch receptacle of the aircraft, and a valve actuation structure, which is configured to selectively actuate a receptacle valve of the pressure switch receptacle, such as to selectively permit fluid communication between the electronic pressure transducer and the fuel supply system via the fitting.

The aircraft include a fuel tank configured to contain a fuel and an engine configured to combust the fuel. The aircraft also include a fuel supply system configured to convey the fuel from the fuel tank to the engine. The fuel supply system includes a fuel boost pump assembly that includes a fuel pump and a pressure switch receptacle, which includes a receptacle valve that defines a nominally closed configuration and is configured to receive a pressure switch. The fuel supply system also includes at least one fuel supply conduit, which fluidly interconnects the fuel tank to the engine via the fuel supply system.

The aircraft further include the transducer assembly. The attachment structure operatively interconnects the electronic pressure transducer to the aircraft via the fitting. In addition, the valve actuation structure selectively actuates the receptacle valve to selectively permit fluid communication between the electronic pressure transducer and the fuel supply system via the fitting.

The methods include removing a pressure switch from a pressure switch receptacle of a fuel boost pump assembly and, responsive to the removing, closing a receptacle valve of the pressure switch receptacle. The methods also include installing a fitting of the transducer assembly within the pressure switch receptacle and opening the receptacle valve. The methods further includes actuating a fuel pump of the fuel boost pump assembly and measuring a fuel pressure produced via actuation of the fuel pump.

DESCRIPTION

FIGS. 1-6 provide illustrative, non-exclusive examples of aircraft 10, of transducer assemblies 100, and/or of methods 200 according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
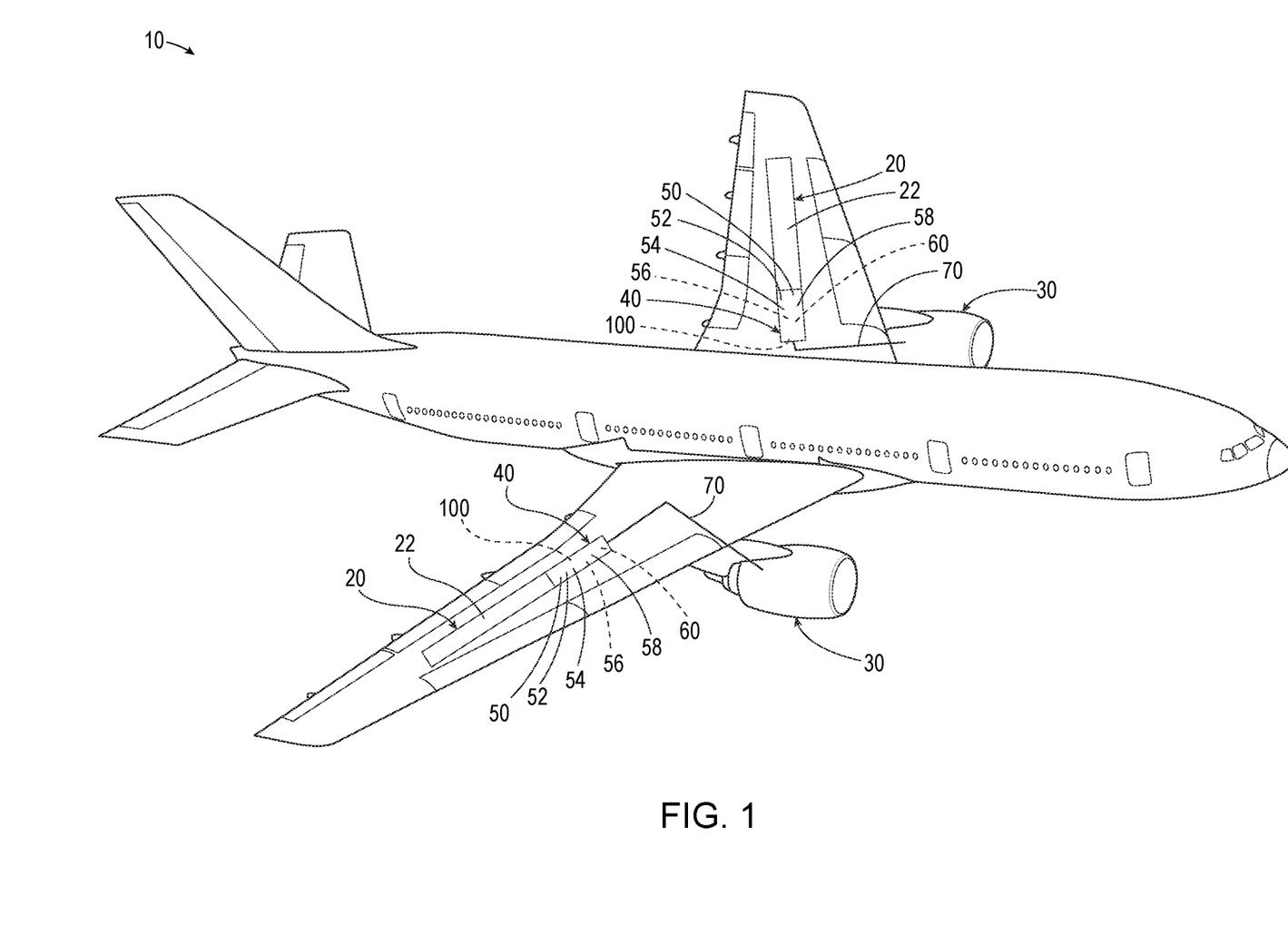
FIG. 1 is an illustration of examples of an aircraft that may include transducer assemblies and/or that may be utilized to perform methods, according to the present disclosure.
Figure 2:
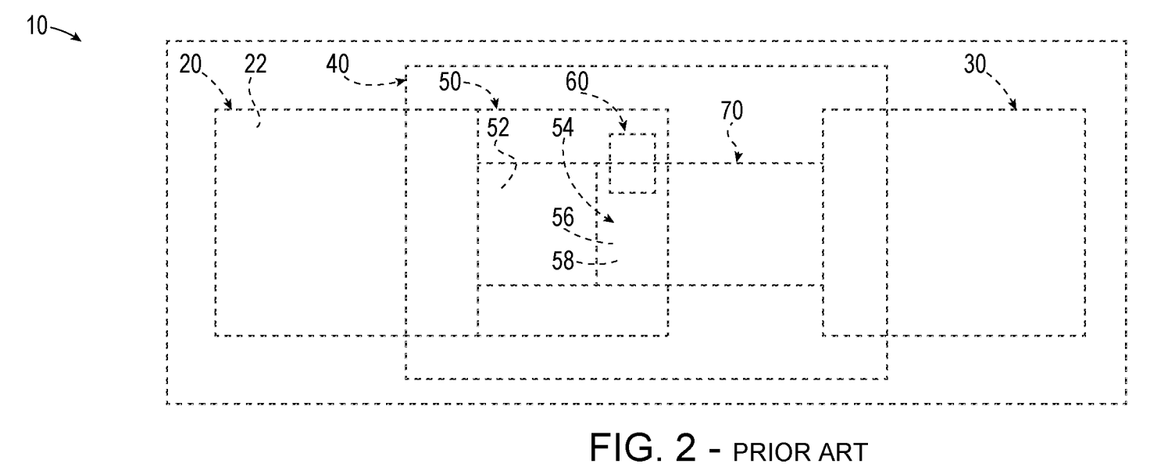
FIG. 2 is a schematic illustration of examples of an aircraft that may include transducer assemblies and/or that may be utilized to perform methods, according to the present disclosure.
Figure 3:
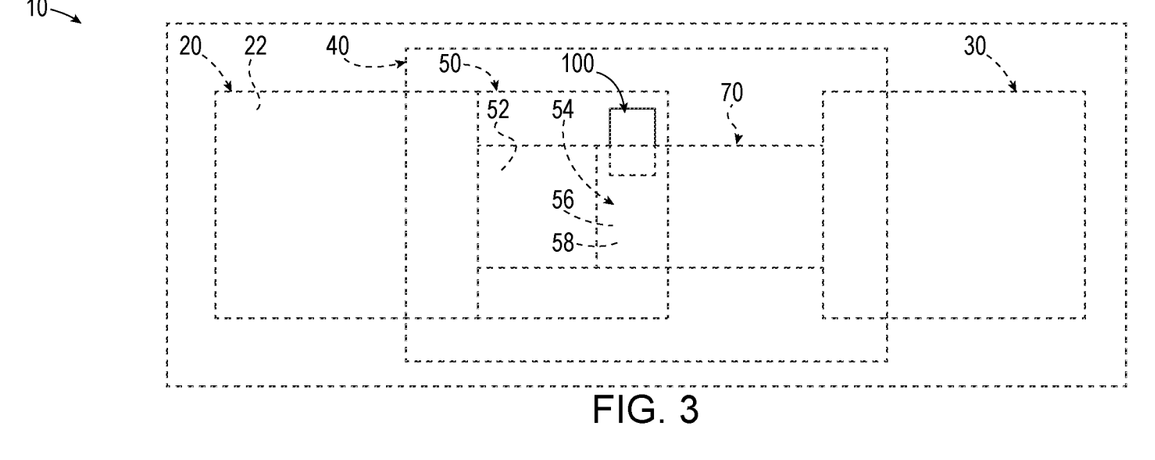
FIG. 3 is a schematic illustration of examples of an aircraft that may include transducer assemblies and/or that may be utilized to perform methods, according to the present disclosure.

FIG. 1 is an illustration of examples of an aircraft 10 that may include transducer assemblies 100 and/or that may be utilized to perform methods 200, according to the present disclosure. FIGS. 2-3 are more schematic illustrations of examples of an aircraft 10 that may include transducer assemblies 100 and/or that may be utilized to perform methods 200, according to the present disclosure.

As collectively illustrated by FIGS. 1-3, aircraft 10 include at least one fuel tank 20, which may be configured to contain and/or to house a fuel 22. Aircraft 10 also include at least one engine 30, which may be configured to combust fuel 22, and a fuel supply system 40, which may be configured to convey fuel 22 from fuel tank 20 to engine 30. Fuel supply system 40 includes at least one fuel boost pump assembly 50 and at least one fuel supply conduit 70. Fuel supply conduit 70 fluidly interconnects fuel tank 20 to engine 30 via fuel supply system 40.

Fuel boost pump assembly 50 includes a fuel pump 52 and a pressure switch receptacle 54. As perhaps best illustrated in FIGS. 4-5, pressure switch receptacle 54 includes a receptacle valve 58, which defines a nominally closed configuration. Pressure switch receptacle 54 is configured to receive a pressure switch 60, as illustrated in dashed lines in FIG. 1 and in solid lines in FIG. 2, and receipt of pressure switch 60 transitions receptacle valve 58 from the nominally closed configuration to an open configuration, thereby permitting pressure switch 60 to be actuated by the fuel pressure of fuel 22 within fuel supply system 40.

As discussed, pressure switch 60 may include and/or be an on/off, a two-state, and/or a bi-state electrical switch, which may be configured to be in one state (e.g., one of an on state and an off state) when the fuel pressure is below a predetermined pressure and to be in the other state (e.g., the other of the on state and the off state) when the fuel pressure is above the predetermined pressure. As such, pressure switch 60 provides an indication, such as to the flight crew of the aircraft, regarding whether or not fuel pump 52 is producing and/or generating the predetermined pressure. However, pressure switch 60 does not provide information regarding the actual fuel pressure that is being generated by fuel pump 52 and/or variations in this fuel pressure with time. As such, pressure switch 60 does not provide significant real-time information regarding performance and/or wear of fuel pump 52.

However, transducer assembly 100 may be utilized, such as during repair and/or maintenance of aircraft 10, to permit and/or to facilitate measurement and/or determination of the fuel pressure, the actual fuel pressure, and/or the real-time fuel pressure that is generated by fuel pump 52. As an example, and as discussed in more detail with reference to methods 200, pressure switch 60 may be removed from fuel supply system 40, such as via being disconnected from pressure switch receptacle 54, and transducer assembly 100 may be selectively installed within fuel supply system 40, such as via connection to pressure switch receptacle 54, to provide additional information regarding operation of fuel pump 52.

As discussed in more detail herein, transducer assembly 100 includes an attachment structure 140 that includes a fitting 150, and fitting 150 may be utilized to operatively interconnect transducer assembly 100 to aircraft 10, such as to fuel supply system 40 and/or to pressure switch receptacle 54 thereof. In addition, and as also discussed in more detail herein, attachment structure 140 includes a valve actuation structure 156, and valve actuation structure 156 may be utilized to selectively actuate receptacle valve 58, such as to transition receptacle valve 58 from the nominally closed state to the open state, thereby permitting and/or facilitating measurement of the fuel pressure of fuel 22 within fuel supply system 40 by transducer assembly 100.

Figure 4:
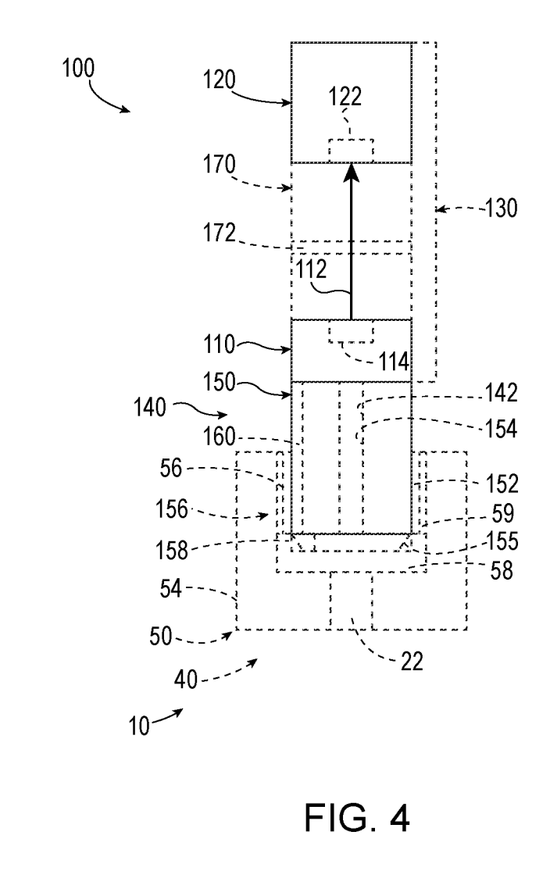
FIG. 4 is a schematic illustration of examples of a transducer assembly that may be operatively interconnected to a pressure switch receptacle of an aircraft, according to the present disclosure, illustrating the transducer assembly disconnected from the pressure switch receptacle.
Figure 5:
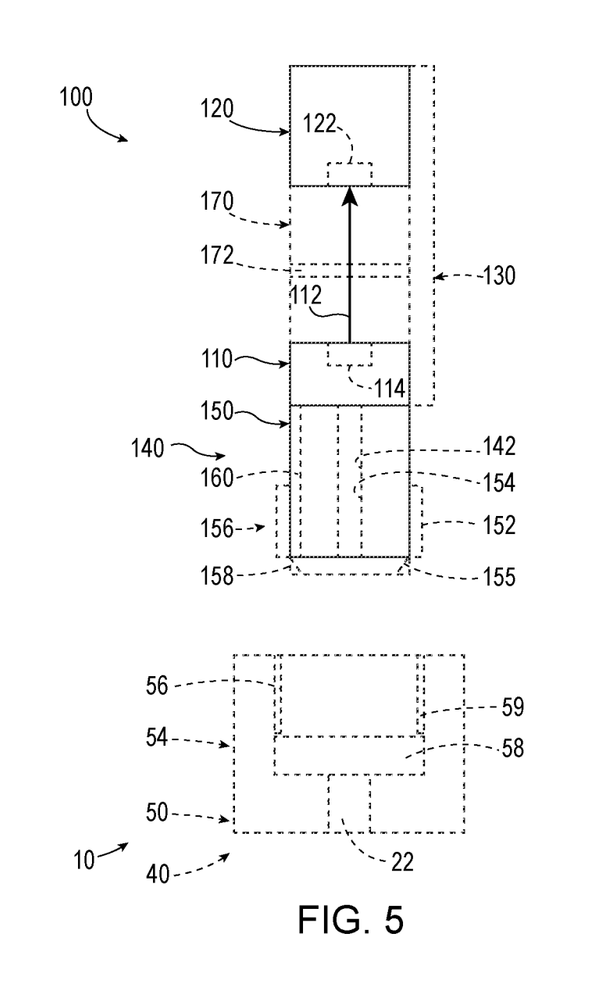
FIG. 5 is a schematic illustration of examples of a transducer assembly that may be operatively interconnected with a pressure switch receptacle of an aircraft, according to the present disclosure, illustrating the transducer assembly operatively interconnected with the pressure switch receptacle.

FIGS. 4-5 are more detailed but still schematic illustrations of transducer assemblies 100, according to the present disclosure. More specifically, FIG. 4 is a schematic illustration of examples of transducer assembly 100 that may be operatively interconnected to a pressure switch receptacle 54 of an aircraft 10 and illustrates transducer assembly 100 disconnected from pressure switch receptacle 54. In contrast, FIG. 5 is a schematic illustration of examples of transducer assembly 100 operatively interconnected with pressure switch receptacle 54. Transducer assemblies 100 may be configured to measure, or to selectively measure, a fuel pressure within a fuel supply system 40 of an aircraft 10. As discussed, the fuel pressure is generated by a fuel boost pump assembly 50, which includes a pressure switch receptacle 54. As also discussed, pressure switch receptacle 54 includes a receptacle valve 58 that defines a nominally closed configuration.

As illustrated in FIGS. 4-5, and with contextual reference to FIGS. 1-3, transducer assemblies 100 include an electronic pressure transducer 110, and electronic pressure display 120, a power supply structure 130, and an attachment structure 140. Electronic pressure transducer 110 is configured to measure the fuel pressure and to generate a fuel pressure signal 112 that is indicative of the fuel pressure. Electronic pressure display 120 is configured to receive fuel pressure signal 112 and to display the fuel pressure responsive to receipt of the fuel pressure signal. Power supply structure 130 is configured to electrically power electronic pressure transducer 110 and electronic pressure display 120.

Attachment structure 140 is configured to operatively interconnect electronic pressure transducer 110 to aircraft 10. As an example, attachment structure 140 may be configured to physically support electronic pressure transducer 110 relative to aircraft 10. As another example, attachment structure 140 may be configured to at least partially define a sealed fluid conduit 142, which may permit, facilitate, and/or provide fluid communication between fuel supply system 40 and electronic pressure transducer 110 and/or may permit exposure of electronic pressure transducer 110 to the fuel pressure of fuel 22 within fuel supply system 40.

Attachment structure 140 includes a fitting 150 and a valve actuation structure 156. Fitting 150 is configured to interface with pressure switch receptacle 54, such as to permit and/or to facilitate mechanical coupling between transducer assembly 100 and aircraft 10. Valve actuation structure 156 is configured to selectively actuate receptacle valve 58 of pressure switch receptacle 54, such as to selectively permit fluid communication between electronic pressure transducer 110 and fuel supply system 40 via fitting 150 and/or via pressure switch receptacle 54.

As discussed in more detail herein, and during operative use of transducer assemblies 100, the transducer assembly may be installed within pressure switch receptacle 54. This is illustrated by the transition from the configuration that is illustrated in FIG. 4 to the configuration that is illustrated in FIG. 5. Responsive and/or subsequent to installation of transducer assembly 100 within pressure switch receptacle 54, receptacle valve 58 may be opened. This is schematically illustrated by valve actuation structure 156 acting against receptacle valve 58 to move the receptacle valve downward, as also illustrated by the transition from the configuration that is illustrated in FIG. 4 to the configuration that is illustrated in FIG. 5. Subsequent to installation of transducer assembly 100 and opening of receptacle valve 58, electronic pressure transducer 110 may be exposed to fuel 22 within fuel supply system 40, thereby permitting electronic pressure transducer 110 to measure the fuel pressure of fuel 22 which, when measured during operation of fuel pump 52, provides a measure of the fuel pressure generated by fuel pump 52. As such, and as discussed, transducer assembly 100 may permit and/or facilitate determination of the fuel pressure generated by fuel pump 52, which may permit and/or facilitate improved determination of the operating condition of fuel pump 52.

Electronic pressure transducer 110 may include and/or be any suitable structure that may be adapted, configured, designed, and/or constructed to measure the fuel pressure and/or to generate fuel pressure signal 112 that is indicative of the fuel pressure. As examples, electronic pressure transducer 110 may include and/or be a strain gauge pressure transducer, a capacitance pressure transducer, a potentiometric pressure transducer, a resonant wire pressure transducer, an inductive pressure transducer, and/or a piezoelectric pressure transducer. As additional examples, electronic pressure transducer 110 may include and/or be a digital electronic pressure transducer, such as may produce and/or generate a digital electric pressure signal 112, and/or an analog electronic pressure transducer, such as may produce and/or generate an analog electric pressure signal 112.

It is within the scope of the present disclosure that electronic pressure transducer 110 may be configured to measure the fuel pressure over any suitable fuel pressure range and/or at any suitable fuel pressure resolution. Examples of the fuel pressure range include ranges of at least 50 kilopascals (kPa), at least 100 kPa, at least 200 kPa, at least 300 kPa, at least 400 kPa, at least 500 kPa, at least 750 kPa, at least 1000 kPa, at most 2000 kPa, at most 1750 kPa, at most 1500 kPa, at most 1250 kPa, at most 1000 kPa, at most 800 kPa, and/or at most 600 kPa. Examples of the fuel pressure resolution include resolutions of at least 0.1 kPa, at least 0.25 kPa, at least 0.5 kPa, at least 1 kPa, at least 5 kPa, at least 10 kPa, at most 100 kPa, at most 80 kPa, at most 60 kPa, at most 50 kPa, at most 40 kPa, at most 30 kPa, at most 20 kPa, and/or at most 10 kPa.

Electronic pressure display 120 may include any suitable structure that may be adapted, configured, designed, and/or constructed to receive fuel pressure signal 112 and/or to display the fuel pressure responsive to receipt of fuel pressure signal 112. In some examples, electronic pressure display 120 may be configured to visually display the fuel pressure. In some examples, the fuel pressure, as displayed by electronic pressure display 120 may be based, at least in part, on fuel pressure signal 112. Examples of electronic pressure display 120 include a light emitting diode, a liquid crystal display, a thing film transistor display, and/or a quantum dot display. As additional examples, electronic pressure display 120 may include and/or be a digital electronic pressure display, such as may receive digital electric pressure signal 112, and/or an analog electronic pressure display, such as may receive analog electric pressure signal 112.

Power supply structure 130 may include and/or be any suitable structure that may be adapted, configured, designed, and/or constructed to electrically power electronic pressure transducer 110 and/or electronic pressure display 120. Power supply structure 130 is illustrated in dashed lines in FIGS. 4-5 to indicate that power supply structure 130 may be incorporated into and/or may electrically power transducer assembly 100 in any suitable manner. In some examples, a single power supply structure 130 may electrically power both electronic pressure transducer 110 and electronic pressure display 120. In some examples, separate and/or distinct components of power supply structure 130 may electrically power electronic pressure transducer 110 and electronic pressure display 120. Examples of power supply structure 130 include an alternating current (AC) power supply structure, a direct current (DC) power supply structure, a battery, a capacitor, an AC-to-DC converter, a DC-to-AC inverter, and/or a mains power source.

Attachment structure 140 may include any suitable structure that may be adapted, configured, designed, and/or constructed to operatively interconnect electronic pressure transducer 110 to aircraft 10. Additionally or alternatively, attachment structure 140 may include any suitable structure that may include and/or at least partially define fitting 150 and/or valve actuation structure 156.

Fitting 150 may include any suitable structure that may be adapted, configured, designed, and/or constructed to interface with pressure switch receptacle 54 and/or to support electronic pressure transducer 110 relative to pressure switch receptacle 54. In some examples, fitting 150 includes a fitting fastening structure 152, which may be configured to operatively interlock with a corresponding receptacle fastening structure 56 of pressure switch receptacle 54. Examples of fitting fastening structure 152 include a threaded fitting fastening structure 152 and/or a male threaded fitting fastening structure 152. Examples of receptacle fastening structure 56 include a threaded receptacle fastening structure 56 and/or a female threaded receptacle fastening structure 56.

As illustrated in dashed lines in FIGS. 4-5, fitting 150 may define a central fluid conduit 154. Central fluid conduit 154 may provide fluid communication between fuel supply system 40 and electronic pressure transducer 110. Additionally or alternatively, central fluid conduit 154 may form and/or define at least a region of sealed fluid conduit 142 of attachment structure 140.

In some examples, and as illustrated in dashed lines in FIGS. 4-5, fitting 150 may include a fitting sealing structure 155, which may be configured to form a fluid steal with pressure switch receptacle 54 and/or with a receptacle sealing structure 59 of pressure switch receptacle 54. Examples of fitting sealing structure 155 and/or of receptacle sealing structure 59 include a seal, a gasket, an o-ring, and/or a sealing surface.

Valve actuation structure 156 may include any suitable structure that may be adapted, configured, designed, and/or constructed to actuate, or to selectively actuate, receptacle valve 58, such as to permit, or to selectively permit, fluid communication between electronic pressure transducer 110 and fuel supply system 40 via fitting 150. In some examples, valve actuation structure 156 may be at last partially, or even completely, defined by fitting 150. In such examples, valve actuation structure 156 may be configured to actuate, or to selectively actuate, receptacle valve 58 responsive to and/or upon attachment structure 140 interconnecting electronic pressure transducer 110 to aircraft 10. As an example, and with continued reference to FIGS. 4-5, fitting 150 may include an extension region 158, which may extend from a remainder of fitting 150. Extension region 158 may be configured to press against receptacle valve 58 to provide a motive force that opens receptacle valve 58 when transducer assembly 100 is operatively interconnected to pressure switch receptacle 54 via attachment structure 140. Extension region 158, when present, may have and/or define any suitable shape. As an example, extension region 158 may include and/or be an at least partially conic extension region 158.

In some examples, valve actuation structure 156 may be configured to be actuated, such as to selectively actuate receptacle valve 58, subsequent to electronic pressure transducer 110 being operatively interconnected to aircraft 10 via attachment structure 140. As an example, valve actuation structure 156 may include and/or be a mechanical actuation structure 160 that may be configured to be actuated, such as by a user of transducer assembly 100, subsequent to electronic pressure transducer 110 being operatively interconnected to aircraft 10 via attachment structure 140. An example of mechanical actuation structure 160 includes a rotary actuation structure configured to be rotated, by the user of transducer assembly 100, to selectively actuate receptacle valve 58. Another example of mechanical actuation structure 160 includes a cam actuation structure configured to be actuated, by the user, to selectively actuate receptacle valve 58. Another example of mechanical actuation structure 160 includes a linear actuation structure configured to be actuated, by the user, to selectively actuate receptacle valve 58.

As illustrated in dashed lines in FIGS. 4-5, transducer assembly 100 may include an electrical cable 170. Electrical cable 170, when present, may be configured to electrically interconnect electronic pressure transducer 110 and electronic pressure display 120 and/or to convey fuel pressure signal 112 from electronic pressure transducer 110 to electronic pressure display 120. Such a configuration may permit and/or facilitate improved, or easier, attachment of transducer assembly 100 to aircraft 10, such as via providing a flexible linkage between electronic pressure transducer 110 and electronic pressure display 120.

As also illustrated in dashed lines in FIGS. 4-5, transducer assembly 100 may include an electrical connector 172. Electrical connector 172, when present, may be configured to be utilized to selectively and electrically connect and/or disconnect electronic pressure transducer 110 and electronic pressure display 120. This may include selective and electrical connection and disconnection with or without utilizing electrical cable 170. Such a configuration may permit and/or facilitate improved, or easier, attachment of transducer assembly 100 to aircraft 10, such as via permitting electronic pressure display 120 to be disconnected from electronic pressure transducer 110 while attachment structure 140 is operatively interconnected to pressure switch receptacle 54 via fitting 150.

Alternatively, electronic pressure transducer 110 and electronic pressure display 120 may be configured to communicate wirelessly with one another. Stated differently, transducer assembly 100 may be configure to wirelessly convey fuel pressure signal 12 from electronic pressure transducer 110 to electronic pressure display 120. As an example, and as also illustrated in dashed lines in FIGS. 4-5, electronic pressure transducer 110 may include a wireless transducer transmitter 114, which may be configured to generate and/or transmit fuel pressure signal 112, such as in the form of a wireless fuel pressure signal 112. In addition, electronic pressure display may include a wireless display receiver 122, which may be configured to receive fuel pressure signal 112, such as in the form of wireless fuel pressure signal 112. In some such examples, electronic pressure display 120 may be included in and/or may form a portion of a computing device, such as a computer, a laptop computer, a tablet, a handheld device, and/or a cellular phone.

Figure 6:
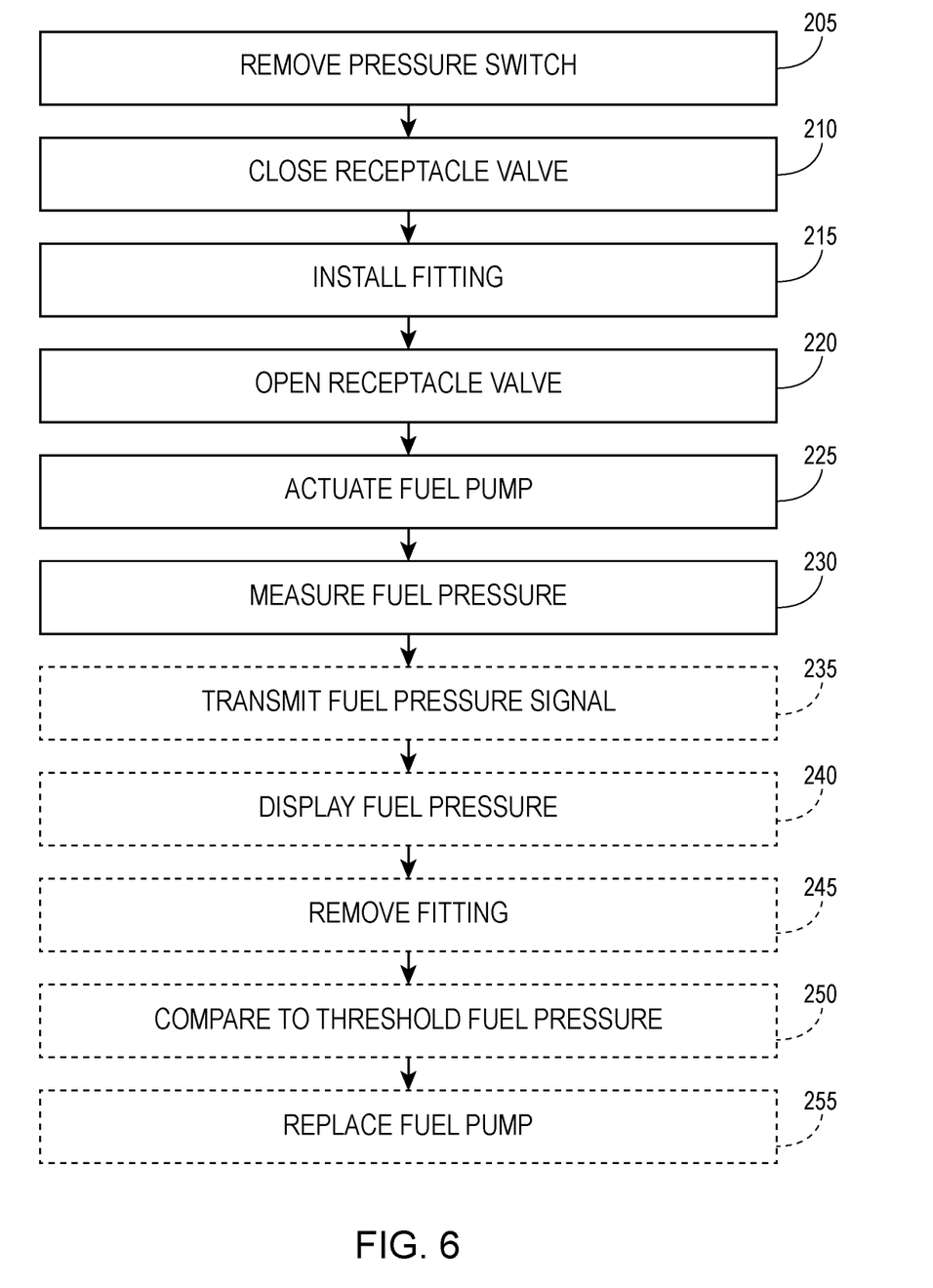
FIG. 6 is a flowchart depicting examples of methods of utilizing a transducer assembly to test performance of a fuel boost pump assembly of an aircraft, according to the present disclosure.

FIG. 6 is a flowchart depicting examples of methods 200 of utilizing a transducer assembly to test performance of a fuel boost pump assembly of an aircraft, according to the present disclosure. Examples of the transducer assembly are disclosed herein with reference to transducer assembly 100. Examples of the fuel boost pump assembly are disclosed herein with reference to fuel boost pump assembly 50. Examples of the aircraft are disclosed herein with reference to aircraft 10. Methods 200 include removing a pressure switch at 205, closing a receptacle valve at 210, and installing a fitting at 215. Methods 200 also include opening a receptacle valve at 220, actuating a fuel pump at 225, and measuring a fuel pressure at 230. Methods 200 also may include transmitting a fuel pressure signal at 235, displaying the fuel pressure at 240, removing the fitting at 245, comparing to a threshold fuel pressure at 250, and/or replacing a fuel pump at 255.

Removing the pressure switch at 205 may include removing the pressure switch from a pressure switch receptacle of the fuel boost pump assembly. This may be accomplished in any suitable manner. As examples, the removing at 205 may include unthreading the pressure switch from the pressure switch receptacle and/or uncoupling the pressure switch from the pressure switch receptacle. Examples of the pressure switch receptacle are disclosed herein with reference to pressure switch receptacle 54.

The removing at 205 may be performed with any suitable timing and/or sequence during methods 200. As examples, the removing at 205 may be performed subsequent to and/or at least partially concurrently with the closing at 210. As additional examples, the removing at 205 may be performed prior to the installing at 215, the opening at 220, the actuating at 225, the measuring at 230, the transmitting at 235, the displaying at 240, the removing at 245, the comparing at 250, and/or the replacing at 255.

The pressure switch receptacle may include the receptacle valve, and the closing the receptacle valve at 210 may include closing the receptacle valve to block and/or to occlude fluid flow through the receptacle valve. The receptacle valve may include and/or be a normally closed receptacle valve, and, prior to the removing at 205, the pressure switch may exert a motive force on the receptacle valve that urges the receptacle valve open, or to an open state. In such a configuration, the removing at 205 may include ceasing application of the motive force to the receptacle valve, thereby permitting and/or facilitating the closing at 210. Examples of the receptacle valve are disclosed herein with reference to receptacle valve 58.

The closing at 210 may be performed with any suitable timing and/or sequence during methods 200. As examples, the closing at 210 may be performed prior to, at least partially concurrently with, and/or responsive to the removing at 205. As additional examples, the closing at 210 may be performed prior to the installing at 215, the opening at 220, the actuating at 225, the measuring at 230, the transmitting at 235, the displaying at 240, the removing at 245, the comparing at 250, and/or the replacing at 255.

The transducer assembly may include a fitting, and the installing the fitting at 215 may include installing the fitting of the transducer assembly within the pressure switch receptacle. This may be accomplished in any suitable manner. As examples, the installing at 215 may include threading the fitting into the pressure switch receptacle and/or coupling the fitting to the pressure switch receptacle. Examples of the fitting at disclosed herein with reference to fitting 150.

In some examples, the installing at 215 further may include forming a fluid seal between the fitting and the pressure switch receptacle. This may include forming the fluid seal to resist leakage of fuel from the pressure switch receptacle, such as subsequent to the opening at 220. The sealing may be performed in any suitable manner, such as via utilizing a fitting sealing structure of the fitting and/or a receptacle sealing structure of the pressure switch receptacle. Examples of the fitting sealing structure are disclosed herein with reference to fitting sealing structure 155. Examples of the receptacle sealing structure are disclosed herein with reference to receptacle sealing structure 59.

The installing at 215 may be performed with any suitable timing and/or sequence during methods 200. As examples, the installing at 215 may be performed subsequent to the removing at 205 and/or the closing at 210. As additional examples, the installing at 215 may be performed prior to and/or at least partially concurrently with the opening at 220. As further examples, the installing at 215 may be performed prior to the opening at 220, the actuating at 225, the measuring at 230, the transmitting at 235, the displaying at 240, the removing at 245, the comparing at 250, and/or the replacing at 255.

Opening the receptacle valve at 220 may include opening the receptacle valve to permit and/or to facilitate fluid flow through the receptacle valve. In some examples, the opening at 220 may be performed responsive to and/or at least partially concurrently with the installing at 215. As an example, and as discussed, the fitting may include a valve actuation structure in the form of an extension region, which may act against the receptacle valve and/or may urge the receptacle valve open upon installation of the fitting within the pressure switch receptacle. In some examples, the opening at 220 may be performed independently from and/or subsequent to, or to completion of, the installing at 215. As an example, the transducer assembly may include a valve actuation structure in the form of a mechanical valve actuation structure, and the opening at 220 may be responsive to actuation of the mechanical valve actuation structure.

Examples of the valve actuation structure are disclosed herein with reference to valve actuation structure 156. Examples of the extension region are disclosed herein with reference to extension region 158. Examples of the mechanical actuation structure are disclosed herein with reference to mechanical actuation structure 160.

The opening at 220 may be performed with any suitable timing and/or sequence during methods 200. As examples, the opening at 220 may be performed subsequent to the removing at 205 and/or the closing at 210. As additional examples, the opening at 220 may be performed prior to the actuating at 225, the measuring at 230, the transmitting at 235, the displaying at 240, the removing at 245, the comparing at 250, and/or the replacing at 255.

The fuel boost pump assembly may include a fuel pump, and the actuating the fuel pump at 225 may include actuation the fuel pump of the fuel boost pump assembly. This may include actuating the fuel pump to produce and/or to generate fuel pressure within a fuel supply system of the aircraft and may be performed in any suitable manner. As an example, the actuating at 225 may include applying and/or providing an electric current to the fuel pump to cause the fuel pump to generate the fuel pressure within a fuel that is contained within, or pumped by, the boost pump assembly. Examples of the fuel supply system are disclosed herein with reference to fuel supply system 40.

The actuating at 225 may be performed with any suitable timing and/or sequence during methods 200. As examples, the actuating at 225 may be performed subsequent to the removing at 205, the closing at 210, the installing at 215, and/or the opening at 220. As additional examples, the actuating at 225 may be performed prior to and/or at least partially concurrently with the measuring at 230, the transmitting at 235, and/or the displaying at 240. As further examples, the actuating at 225 may be performed prior to the removing at 245, the comparing at 250, and/or the replacing at 260.

Measuring the fuel pressure at 230 may include measuring fuel pressure that is produced and/or generated via actuation of the fuel pump, such as during and/or responsive to the actuating at 225. The measuring at 230 may include electrically measuring the fuel pressure, such as utilizing an electronic pressure transducer of the transducer assembly. Examples of the electronic pressure transducer are disclosed herein with reference to electronic pressure transducer 110. In some examples, the measuring at 230 further may include generating a fuel pressure signal with the electronic pressure transducer. Examples of the fuel pressure signal are disclosed herein with reference to fuel pressure signal 112.

The measuring at 230 may be performed with any suitable timing and/or sequence during methods 200. As examples, the measuring at 230 may be performed subsequent to the removing at 205, the closing at 210, the installing at 215, and/or the opening at 220. As additional examples, the measuring at 230 may be performed prior to and/or at least partially concurrently with the transmitting at 235 and/or the displaying at 240. As further examples, the measuring at 230 may be performed prior to the removing at 245, the comparing at 250, and/or the replacing at 255.

Transmitting the fuel pressure signal at 235 may include transmitting the fuel pressure signal from the electronic pressure transducer to an electronic pressure display of the transducer assembly. Examples of the electronic pressure display are disclosed herein with reference to electronic pressure display 120.

The transmitting at 235 may be performed in any suitable manner. As an example, the transmitting at 235 may include transmitting the fuel pressure signal with, via, and/or utilizing an electrical cable, examples of which are disclosed herein with reference to electrical cable 170. As another example, the transmitting at 235 may include wirelessly transmitting the fuel pressure signal, such as utilizing a wireless transducer transmitter of the electronic pressure transducer in combination with a wireless display receiver of the electronic pressure display. Examples of the wireless transducer transmitter are disclosed herein with reference to wireless transducer transmitter 114. Examples of the wireless display receiver are disclosed herein with reference to wireless display receiver 122.

The transmitting at 235 may be performed with any suitable timing and/or sequence during methods 200. As examples, the transmitting at 235 may be performed subsequent to the removing at 205, the closing at 210, the installing at 215, and/or the opening at 220. As additional examples, the transmitting at 235 may be performed subsequent to and/or at least partially concurrently with the measuring at 230. As further examples, the transmitting at 235 may be performed prior to and/or at least partially concurrently with the displaying at 240. As additional examples, the transmitting at 235 may be performed prior to the removing at 245, the comparing at 250, and/or the replacing at 255.

Displaying the fuel pressure at 240 may include displaying the fuel pressure with, via, and/or utilizing the electronic pressure display of the transducer assembly. This may include displaying the fuel pressure to a user of the transducer assembly, such as to permit and/or facilitate the comparing at 250.

The displaying at 240 may be performed with any suitable timing and/or sequence during methods 200. As examples, the displaying at 240 may be performed subsequent to the removing at 205, the closing at 210, the installing at 215, and/or the opening at 220. As additional examples, the displaying at 240 may be performed subsequent to and/or at least partially concurrently with the measuring at 230 and/or the transmitting at 235. As further examples, the displaying at 240 may be performed prior to the removing at 245, the comparing at 250, and/or the replacing at 255.

Removing the fitting at 245 may include removing the fitting from the pressure switch receptacle. In some examples, the removing at 245 further may include installing the pressure switch, or a different pressure switch, within the pressure switch receptacle. Stated differently, and upon completion of the displaying at 240, methods 200 may include reinstalling the pressure switch, or installing the different, or a new, pressure switch, such as to permit and/or facilitate normal operation of the aircraft.

The removing at 245 may be performed with any suitable timing and/or sequence during methods 200. As examples, the removing at 245 may be performed subsequent to the removing at 205, the closing at 210, the installing at 215, the opening at 220, the actuating at 225, the measuring at 230, the transmitting at 235, and/or the displaying at 240. As additional examples, the removing at 245 may be performed prior to, at least partially concurrently with, and/or subsequent to the comparing at 250 and/or the replacing at 255.

Comparing to the threshold fuel pressure at 250 may include comparing the fuel pressure, such as may be measured during the measuring at 230 and/or displayed during the displaying at 240, to a threshold fuel pressure. This may include comparing to permit and/or facilitate determination of an operational condition of the fuel pump. As an example, and when the fuel pressure is greater than the threshold fuel pressure, it may be determined that the fuel pump is suitable for operation within the aircraft. As another example, and when the fuel pressure is less than the threshold fuel pressure, it may be determined that the fuel pump should be replaced, such as via initiation of the replacing at 255.

It is within the scope of the present disclosure that the threshold pressure may be equal, or at least substantially equal, to a transition pressure at which the pressure switch transitions from the on state to the off state and/or from the off state to the on state. However, it is also within the scope of the present disclosure that the threshold pressure may differ from the transition pressure of the pressure switch. As an example, the threshold pressure may be greater than the transition pressure of the pressure switch. Such a configuration may permit and/or facilitate responding to wear of the fuel pump prior to the fuel pump being unable to produce and/or generate the transition pressure for the pressure switch.

The comparing at 250 may be performed with any suitable timing and/or sequence during methods 200. As examples, the comparing at 250 may be performed subsequent to the removing at 205, the closing at 210, the installing at 215, the opening at 220, and/or the actuating at 225. As additional examples, the comparing at 250 may be performed subsequent to and/or at least partially concurrently with the measuring at 230, the transmitting at 235, and/or the displaying at 240. As further examples, the comparing at 250 may be performed prior to, subsequent to, and/or at least partially concurrently with the removing at 245. As an additional example, the comparing at 250 may be performed prior to the replacing at 255.

Replacing the fuel pump at 255 may include replacing the fuel pump responsive to the fuel pressure being less than the threshold fuel pressure. Stated differently, the replacing at 255 may include replacing the fuel pump responsive to the comparing at 250 establishing and/or determining that the fuel pressure is less than the threshold fuel pressure. The replacing at 255 may include disconnecting the fuel pump from the fuel supply system of the aircraft and installing a new, a refurbished, and/or a different fuel pump within the fuel supply system of the aircraft.

In some examples, the replacing at 255 further may include repeating at least a subset of methods 200, such as to establish that fuel pressure generated by the new, refurbished, and/or different fuel pump is greater than the threshold fuel pressure. As examples, the repeating may include repeating the removing at 205, the closing at 210, the installing at 215, the opening at 220, the actuating at 225, the measuring at 230, the transmitting at 235, the displaying at 240, the removing at 245, and/or the comparing at 250. As additional examples, and upon determining that the fuel pressure generated by the new, refurbished, and/or different fuel pump is less than the threshold fuel pressure, the repeating may include repeating the replacing at 255 to install another fuel pump within the fuel supply system of the aircraft.

Illustrative, non-exclusive examples of inventive subject matter according to the present disclosure are described in the following enumerated paragraphs:

A1. A transducer assembly (100) configured to selectively measure a fuel pressure within a fuel supply system (40) of an aircraft (10), wherein the fuel pressure is generated by a fuel boost pump assembly (50) of the aircraft (10), and further wherein the fuel boost pump assembly (50) includes a pressure switch receptacle (54), which includes a receptacle valve (58) that defines a nominally closed configuration and is configured to receive a pressure switch (60), the transducer assembly (100) comprising:
- an electronic pressure transducer (110) configured to measure the fuel pressure and to generate a fuel pressure signal (112) indicative of the fuel pressure;
- an electronic pressure display (120) configured to receive the fuel pressure signal (112) and to display the fuel pressure responsive to receipt of the fuel pressure signal (112);
- a power supply structure (130) configured to electrically power the electronic pressure transducer (110) and the electronic pressure display (120); and
- an attachment structure (140) configured to operatively interconnect the electronic pressure transducer (110) to the aircraft (10), wherein the attachment structure (140) includes:
  - (i) a fitting (150) configured to interface with the pressure switch receptacle (54); and
  - (ii) a valve actuation structure (156) configured to selectively actuate the receptacle valve (58) to selectively permit fluid communication between the electronic pressure transducer (110) and the fuel supply system (40) via the fitting (150).

A2. The transducer assembly (100) of paragraph A1, wherein the electronic pressure transducer (110) is configured to generate the fuel pressure signal (112) in the form of at least one of:
- (i) a digital electric pressure signal; and
- (ii) an analog electric pressure signal.

A3. The transducer assembly (100) of any of paragraphs A1-A2, wherein the electronic pressure transducer (110) includes at least one of a strain gauge pressure transducer, a capacitance pressure transducer, a potentiometric pressure transducer, a resonant wire pressure transducer, an inductive pressure transducer, and a piezoelectric pressure transducer.

A4. The transducer assembly (100) of any of paragraphs A1-A3, wherein the electronic pressure display (120) is configured to receive the fuel pressure signal (112) in the form of at least one of:
- (i) a digital electric pressure signal; and
- (ii) an analog electric pressure signal.

A5. The transducer assembly (100) of any of paragraphs A1-A4, wherein the electronic pressure display (120) is configured to visually display the fuel pressure.

A6. The transducer assembly (100) of any of paragraphs A1-A5, wherein the fuel pressure, as displayed by the electronic pressure display (120), is based, at least in part, on the fuel pressure signal (112).

A7. The transducer assembly (100) of any of paragraphs A1-A6, wherein the electronic pressure display (120) includes at least one of a light emitting diode (LED) display, a liquid crystal display, a thin film transistor display, and a quantum dot display.

A8. The transducer assembly (100) of any of paragraphs A1-A7, wherein the power supply structure (130) includes at least one of an alternating current power supply structure, a direct current power supply structure, an electrical energy storage device, a battery, a capacitor, an AC-to-DC converter, a DC-to-AC inverter, and a mains power source.

A9. The transducer assembly (100) of any of paragraphs A1-A8, wherein the attachment structure (140) is configured to physically support the electronic pressure transducer (110) relative to the aircraft (10).

A10. The transducer assembly (100) of any of paragraphs A1-A9, wherein the attachment structure (140) is configured to at least partially define a sealed fluid conduit (142) that provides fluid communication between the fuel supply system (40) and the electronic pressure transducer (110).

A11. The transducer assembly (100) of any of paragraphs A1-A10, wherein the fitting (150) includes a fitting fastening structure (152) configured to operatively interlock with a corresponding receptacle fastening structure (56) of the pressure switch receptacle (54).

A12. The transducer assembly (100) of paragraph A11, wherein at least one of:
- (i) the fitting fastening structure (152) includes a threaded fitting fastening structure;
- (ii) the fitting fastening structure (152) includes a male threaded fitting fastening structure;
- (iii) the receptacle fastening structure (56) includes a threaded receptacle fastening structure; and
- (iv) the receptacle fastening structure (56) includes a female threaded receptacle fastening structure.

A13. The transducer assembly (100) of any of paragraphs A1-A12, wherein the fitting (150) defines a central fluid conduit (154) that provides fluid communication between the fuel supply system (40) and the electronic pressure transducer (110).

A14. The transducer assembly (100) of any of paragraphs A1-A13, wherein the fitting (150) further includes a fitting sealing structure (155) configured to form a fluid seal with the pressure switch receptacle (54).

A15. The transducer assembly (100) of any of paragraphs A1-A14, wherein the valve actuation structure (156) is at least partially defined by the fitting (150).

A16. The transducer assembly (100) of paragraph A15, wherein the valve actuation structure (156) is configured to actuate the receptacle valve (58) responsive to the attachment structure (140) operatively interconnecting the electronic pressure transducer (110) to the aircraft (10).

A17. The transducer assembly (100) of any of paragraphs A15-A16, wherein the fitting (150) includes an extension region (158) that extends from the fitting (150), and further wherein the extension region (158) is configured to press against the receptacle valve (58) to provide a motive force that opens the receptacle valve (58) when the electronic pressure transducer (110) is operatively interconnected to the pressure switch receptacle (54) via the attachment structure (140).

A18. The transducer assembly (100) of paragraph A17, wherein the extension region (158) includes an at least partially conic extension region (158).

A19. The transducer assembly (100) of any of paragraphs A1-A18, wherein the valve actuation structure (156) is configured to be actuated subsequent to the electronic pressure transducer (110) being operatively interconnected to the aircraft (10) via the attachment structure (140), to selectively actuate the receptacle valve (58).

A20. The transducer assembly (100) of any of paragraphs A1-A19, wherein the valve actuation structure (156) includes a mechanical actuation structure (160) that includes at least one of:
  (i) a rotary actuation structure configured to be rotated, by a user of the transducer assembly (100), to selectively actuate the receptacle valve (58);
  (ii) a cam actuation structure configured to be actuated, by the user, to selectively actuate the receptacle valve (58); and
  (iii) a linear actuation structure configured to be actuated, by the user, to selectively actuate the receptacle valve (58).

A21. The transducer assembly (100) of any of paragraphs A1-A20, wherein the transducer assembly (100) further includes an electrical cable (170) that electrically interconnects the electronic pressure transducer (110) and the electronic pressure display (120) and is configured to convey the fuel pressure signal (112) from the electronic pressure transducer (110) to the electronic pressure display (120).

A22. The transducer assembly (100) of any of paragraphs A1-A21, wherein the transducer assembly (100) further includes an electrical connector (172) configured to be utilized to selectively and electrically connect the electronic pressure transducer (110) and the electronic pressure display (120) and to selectively and electrically disconnect the electronic pressure transducer (110) from the electronic pressure display (120).

A23. The transducer assembly (100) of any of paragraphs A1-A20, wherein the electronic pressure transducer (110) includes a wireless transducer transmitter (114), wherein the electronic pressure display (120) includes a wireless display receiver (122), and further wherein the transducer assembly (100) is configured to wirelessly convey the fuel pressure signal (112) from the electronic pressure transducer (110) to the electronic pressure display (120) utilizing the wireless transducer transmitter (114) and the wireless display receiver (122).

B1. An aircraft (10), comprising:
  a fuel tank (20) configured to contain a fuel (22);
  an engine (30) configured to combust the fuel (22);
  a fuel supply system (40) configured to convey the fuel (22) from the fuel tank (20) to the engine (30), wherein the fuel supply system (40) includes:
    (i) a fuel boost pump assembly (50) that includes:
      (a) a fuel pump (52); and
      (b) a pressure switch receptacle (54) that includes a receptacle valve (58) that defines a nominally closed configuration and is configured to receive a pressure switch (60); and
    (ii) at least one fuel supply conduit (70) that fluidly interconnects the fuel tank (20) to the engine (30) via the fuel supply system (40); and
  the transducer assembly (100) of any of paragraphs A1-A23, wherein the attachment structure (140) operatively interconnects the electronic pressure transducer (110) to the aircraft (10) via the fitting (150), and further wherein the valve actuation structure (156) selectively actuates the receptacle valve (58) to selectively permit fluid communication between the electronic pressure transducer (110) and the fuel supply system (40) via the fitting (150).

C1. A method (200) of utilizing a transducer assembly (100) to test performance of a fuel boost pump assembly (50) of an aircraft (10), the method (200) comprising:

removing (205) a pressure switch (60) from a pressure switch receptacle (54) of the fuel boost pump assembly (50);
responsive to the removing (205), closing (210) a receptacle valve (58) of the pressure switch receptacle (54);
installing (215) a fitting (150) of the transducer assembly (100) within the pressure switch receptacle (54);
opening (220) the receptacle valve (58);
actuating (225) a fuel pump (52) of the fuel boost pump assembly (50); and
measuring (230) a fuel pressure produced via actuation of the fuel pump (52).

C2. The method (200) of paragraph C1, wherein the removing (205) the pressure switch (60) includes unthreading the pressure switch (60) from the pressure switch receptacle (54), and further wherein the installing (215) the fitting (150) includes threading the fitting (150) into the pressure switch receptacle (54).

C3. The method (200) of any of paragraphs C1-C2, wherein the opening (220) the receptacle valve (58) is responsive to the installing (215) the fitting (150).

C4. The method (200) of any of paragraphs C1-C2, wherein the opening (220) the receptacle valve (58) is subsequent to the installing (215) the fitting (150).

C5. The method (200) of paragraph C4, wherein the opening (220) the receptacle valve (58) is responsive to actuation of a mechanical actuation structure (160) of the transducer assembly (100).

C6. The method (200) of any of paragraphs C1-05, wherein the actuating (225) the fuel pump (52) includes applying an electric current to the fuel pump (52) to cause the fuel pump (52) to generate the fuel pressure within a fuel (22) contained within the fuel boost pump assembly (50).

C7. The method (200) of any of paragraphs C1-C6, wherein the measuring (230) includes electrically measuring the fuel pressure utilizing an electronic pressure transducer (110) of the transducer assembly (100).

C8. The method (200) of paragraph C7, wherein the method (200) further includes displaying (240) the fuel pressure utilizing an electronic pressure display (120) of the transducer assembly (100).

C9. The method (200) of paragraph C8, wherein the measuring (230) includes generating a fuel pressure signal (112) with the electronic pressure transducer (110), and further wherein the method (200) includes transmitting (235) the fuel pressure signal (112) from the electronic pressure transducer (110) to the electronic pressure display (120).

C10. The method (200) of any of paragraphs C1-C9, wherein the method (200) further includes comparing (250) the fuel pressure to a threshold fuel pressure.

C11. The method (200) of paragraph C10, wherein the method (200) further includes replacing (255) the fuel pump (52) responsive to the fuel pressure being less than the threshold fuel pressure.

C12. The method (200) of any of paragraphs C10-C11, wherein, subsequent to the measuring (230), the method (200) further includes removing (245) the fitting (150) of the transducer assembly (100) from the pressure switch receptacle (54) and installing at least one of the pressure switch (60) and a different pressure switch (60) within the pressure switch receptacle (54).

C13. The method (200) of any of paragraphs C1-C12, wherein the transducer assembly (100) includes any suitable structure, function, and/or feature of any of the transducer assemblies of any of paragraphs A1-A22.

C14. The method (200) of any of paragraphs C1-C12, wherein the aircraft (10) includes any suitable structure, function, and/or feature of the aircraft (10) of paragraph B1.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A transducer assembly configured to selectively measure a fuel pressure within a fuel supply system of an aircraft, wherein the fuel pressure is generated by a fuel boost pump assembly of the aircraft, and further wherein the fuel boost pump assembly includes a pressure switch receptacle, which includes a receptacle valve that defines a nominally closed configuration and is configured to receive a pressure switch, the transducer assembly comprising:
   an electronic pressure transducer configured to measure the fuel pressure and to generate a fuel pressure signal indicative of the fuel pressure;
   an electronic pressure display configured to receive the fuel pressure signal and to display the fuel pressure responsive to receipt of the fuel pressure signal;
   a power supply structure configured to electrically power the electronic pressure transducer and the electronic pressure display; and
   an attachment structure configured to operatively interconnect the electronic pressure transducer to the aircraft, wherein the attachment structure includes:
   (i) a fitting configured to interface with the pressure switch receptacle, wherein the fitting includes a fitting fastening structure configured to operatively interlock with a corresponding receptacle fastening structure of the pressure switch receptacle; and
   (ii) a valve actuation structure at least partially defined by the fitting and configured to selectively actuate the receptacle valve to selectively permit fluid communication between the electronic pressure transducer and the fuel supply system via the fitting, wherein the valve actuation structure is configured to actuate the receptacle valve to permit the fluid communication responsive to the fitting fastening structure being operatively interlocked with the corresponding receptacle fastening structure of the pressure switch receptacle.

2. The transducer assembly of claim 1, wherein the electronic pressure transducer is configured to generate the fuel pressure signal in the form of at least one of:
 (i) a digital electric pressure signal; and
 (ii) an analog electric pressure signal.

3. The transducer assembly of claim 1, wherein the electronic pressure display is configured to receive the fuel pressure signal in the form of at least one of:
 (i) a digital electric pressure signal; and
 (ii) an analog electric pressure signal.

4. The transducer assembly of claim 1, wherein the electronic pressure display is configured to visually display the fuel pressure.

5. The transducer assembly of claim 1, wherein the attachment structure is configured to at least partially define a sealed fluid conduit that provides the fluid communication between the fuel supply system and the electronic pressure transducer.

6. The transducer assembly of claim 1, wherein the fitting defines a central fluid conduit that provides the fluid communication between the fuel supply system and the electronic pressure transducer.

7. The transducer assembly of claim 1, wherein the fitting includes an extension region that extends from the fitting, and further wherein the extension region is configured to press against the receptacle valve to provide a motive force that opens the receptacle valve to permit the fluid communication responsive to when the electronic pressure transducer is operatively interconnected to the pressure switch receptacle via the attachment structure.

8. The transducer assembly of claim 7, wherein the extension region includes an at least partially conic extension region.

9. The transducer assembly of claim 1, wherein the valve actuation structure is a mechanical valve actuation structure configured to be actuated, subsequent to the electronic pressure transducer being operatively interconnected to the aircraft via the attachment structure, to selectively actuate the receptacle valve, and further wherein the valve actuation structure includes at least one of:
 (i) a rotary actuation structure configured to be rotated by a user of the transducer assembly to selectively actuate the receptacle valve;
 (ii) a cam actuation structure configured to be actuated by the user to selectively actuate the receptacle valve; and
 (iii) a linear actuation structure configured to be actuated by the user to selectively actuate the receptacle valve.

10. The aircraft, comprising:
 a fuel tank configured to contain a fuel;
 an engine configured to combust the fuel;
 the fuel supply system configured to convey the fuel from the fuel tank to the engine, wherein the fuel supply system includes:
 (i) the fuel boost pump assembly that includes:
  (a) a fuel pump; and
  (b) the pressure switch receptacle that includes the receptacle valve that defines a nominally closed configuration and is configured to receive a pressure switch; and
 (ii) at least one fuel supply conduit that fluidly interconnects the fuel tank to the engine via the fuel supply system; and
 the transducer assembly of claim 1, wherein the attachment structure operatively interconnects the electronic pressure transducer to the aircraft via the fitting, and further wherein the valve actuation structure selectively actuates the receptacle valve to selectively permit fluid communication between the electronic pressure transducer and the fuel supply system via the fitting.

11. The transducer assembly of claim 1, further utilized to test performance of the fuel boost pump assembly of the aircraft, wherein the test comprises:
 removing the pressure switch from the pressure switch receptacle of the fuel boost pump assembly;
 responsive to the removing, closing the receptacle valve of the pressure switch receptacle;
 installing the fitting of the transducer assembly within the pressure switch receptacle;
 opening the receptacle valve;
 actuating a fuel pump of the fuel boost pump assembly; and
 measuring the fuel pressure produced via actuation of the fuel pump.

12. The transducer assembly of claim 11, wherein the removing the pressure switch includes unthreading the pressure switch from the pressure switch receptacle, and further wherein the installing the fitting includes threading the fitting into the pressure switch receptacle.

13. The transducer assembly of claim 11, wherein the opening the receptacle valve is responsive to the installing the fitting.

14. The transducer assembly of claim 11, wherein the opening the receptacle valve is subsequent to the installing the fitting.

15. The transducer assembly of claim 11, wherein the measuring includes electrically measuring the fuel pressure utilizing the electronic pressure transducer of the transducer assembly.

16. The transducer assembly of claim 11, wherein the test further includes comparing the fuel pressure to a threshold fuel pressure.

17. The transducer assembly of claim 16, wherein the test further includes replacing the fuel pump responsive to the fuel pressure being less than the threshold fuel pressure.

* * * * *